US010132706B2

(12) United States Patent
Perkins et al.

(10) Patent No.: US 10,132,706 B2
(45) Date of Patent: Nov. 20, 2018

(54) WATERPROOF BAROMETRIC SENSOR IN AN ELECTRONIC DEVICE

(71) Applicant: Apple Inc., Cupertino, CA (US)

(72) Inventors: Ryan C. Perkins, Sunnyvale, CA (US); Tyler S. Bushnell, Mountain View, CA (US); David M. Pelletier, Mountain View, CA (US); William C. Lukens, San Francisco, CA (US); Steven P. Cardinali, Campbell, CA (US); Rex T. Ehman, San Jose, CA (US)

(73) Assignee: Apple Inc., Cupertino, CA (US)

(*) Notice: Subject to any disclaimer, the term of this patent is extended or adjusted under 35 U.S.C. 154(b) by 159 days.

(21) Appl. No.: 15/246,471

(22) Filed: Aug. 24, 2016

(65) Prior Publication Data

US 2017/0089795 A1 Mar. 30, 2017

Related U.S. Application Data

(60) Provisional application No. 62/233,994, filed on Sep. 28, 2015.

(51) Int. Cl.
*G01L 19/06* (2006.01)
*G01L 9/00* (2006.01)
*G01L 9/04* (2006.01)

(52) U.S. Cl.
CPC ........ *G01L 19/0672* (2013.01); *G01L 9/0051* (2013.01); *G01L 9/0072* (2013.01); *G01L 9/0077* (2013.01)

(58) Field of Classification Search
CPC ........ G01C 13/008; G01C 5/06; G01C 19/14; G04G 21/02; B63C 11/32; B63C 2011/021; B63C 11/02; G04C 17/0091; G01L 19/0672; G01L 9/04; G01L 9/0072; G01L 9/0077
See application file for complete search history.

(56) References Cited

U.S. PATENT DOCUMENTS 4,835,716 A * 5/1989 Tamaki ............... B63C 11/32
368/14
5,279,164 A * 1/1994 Araki ............... G01L 19/147
338/4

(Continued)

*Primary Examiner* — Harshad R Patel
*Assistant Examiner* — Brandi Hopkins
(74) *Attorney, Agent, or Firm* — Dickinson Wright RLLP

(57) ABSTRACT

An electronic device having a pressure detection system is disclosed. The electronic device may include one or more elements designed to detect pressure exerted on the electronic device. In some embodiments, the electronic device includes a membrane and a detection mechanism, both of which bend in response to a pressure change at the membrane. The membrane may be electrically coupled with a circuit that detects the bending of the membrane and correlates the bending with a pressure change at the membrane. A can may be hermetically sealed with the membrane and surround the circuit to shield the circuit from liquid ingress. In some embodiments, a light transmitter and light receiver are used to detect the bending of the membrane. The light may reflect from the membrane at different angles, based upon a shape of the membrane, and contact the receiving element at different locations, corresponding to pressure change.

20 Claims, 10 Drawing Sheets

(56) References Cited

U.S. PATENT DOCUMENTS

| | | | | |
|---|---|---|---|---|
| 6,311,561 B1* | 11/2001 | Bang | ............... | G01L 9/0073 |
| | | | | 73/708 |
| 6,754,137 B1 | 6/2004 | Bourquin et al. | | |
| 6,925,885 B2* | 8/2005 | Ishio | ............... | G01L 19/143 |
| | | | | 73/715 |
| 7,908,921 B2 | 3/2011 | Binda et al. | | |
| 8,965,730 B2* | 2/2015 | Yuen | ............... | G01B 21/16 |
| | | | | 702/141 |
| 2009/0293628 A1* | 12/2009 | Brown | ............... | G01L 9/0055 |
| | | | | 73/723 |
| 2012/0034109 A1* | 2/2012 | Tout | ............... | F04B 43/046 |
| | | | | 417/313 |
| 2013/0209281 A1* | 8/2013 | Locke | ............... | F04B 51/00 |
| | | | | 417/63 |
| 2017/0089698 A1* | 3/2017 | Ehman | ............... | G01C 5/06 |

\* cited by examiner

WATERPROOF BAROMETRIC SENSOR IN AN ELECTRONIC DEVICE

CROSS-REFERENCE TO RELATED APPLICATION(S)

This application claims the benefit of priority to U.S. Provisional Application No. 62/233,994, filed on Sep. 28, 2015, and titled "WATERPROOF BAROMETRIC SENSOR IN AN ELECTRONIC DEVICE," the disclosure of which is incorporated herein by reference in its entirety.

FIELD

The described embodiments relate to a sensor used in an electronic device. In particular, the described embodiments relate to a modified sensor designed to detect pressure while also limiting ingress of liquid contaminants.

BACKGROUND

An electronic device, including a wearable electronic device, may include one or more sensing elements to detect certain changing conditions. Further, these sensing elements may couple with a circuit board (that includes a processor circuit), along with a flexible circuit in order to communicate with other circuits in the electronic device. Accordingly, the sensing elements rely upon electrical current to function.

While an electronic device having sensing elements may offer an improved user experience, the electronic device may be vulnerable to other issues as a result of the sensing elements. For example, if a sensing element is exposed to a liquid contaminant, such as water, the liquid contaminant may cause the processor circuit to short circuit, causing damage not only to the sensing element but also the electronic device.

SUMMARY

In one aspect, a sensor for detecting pressure exerted on an electronic device is described. The sensor may include a membrane that bends in response to the pressure. The sensor may further include a detection mechanism secured with the membrane. The sensor may further include a circuit electrically coupled with the detection mechanism. In some embodiments, the detection mechanism bends in conjunction with the membrane and provides an electrical output to the circuit to determine the pressure.

In another aspect, an electronic device having an enclosure and an opening is described. The electronic device may include a sensor for determining pressure. The sensor may include a membrane secured with the enclosure at the opening. The membrane can be configured to bend in response to a change in the pressure at the membrane. The sensor may further include a light emitter configured to emit light in a direction toward the membrane. The sensor may further include a light receiver configured to receive the light from the light emitter that is reflected from the membrane to a location of the light receiver. The location can be used to determine the pressure.

In another aspect, a method for assembling a sensor in an electronic device having an enclosure and an opening is described. The sensor can be configured to determine pressure exerted on the electronic device. The method may include securing a membrane with the enclosure at the opening. The membrane can be configured to bend in response to a change in the pressure at the membrane. The method may further include providing a light emitter configured to emit light in a direction toward the membrane. The method may further include providing a light receiver configured to receive the light from the light emitter that is reflected from the membrane to a location of the light receiver. The location can be used to determine the pressure.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
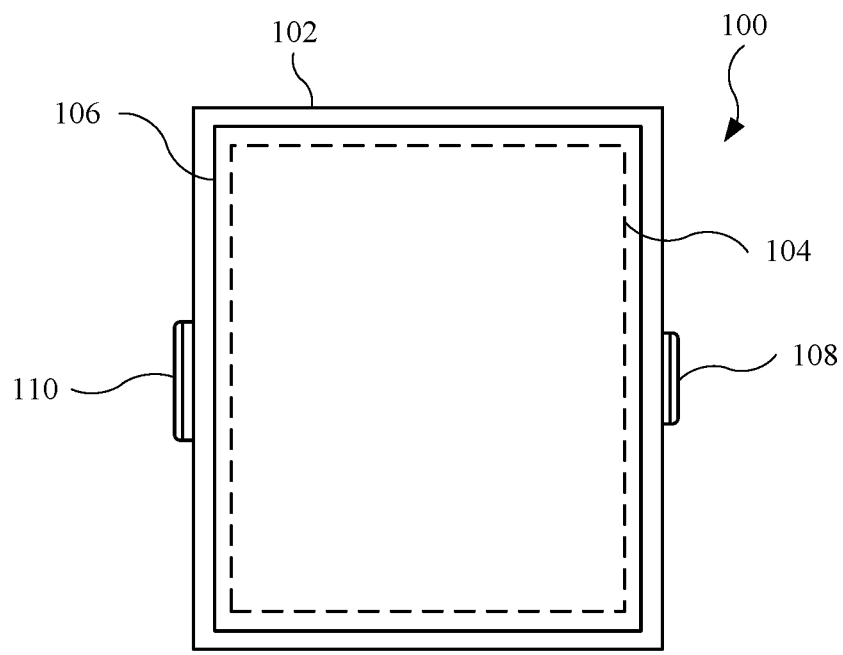
FIG. 1 illustrates a front view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to an electronic device designed to detect pressure exerted on the electronic device. In particular, the electronic device described herein may include a pressure sensor, or barometric sensor, that determines the pressure. In addition, the pressure sensor may be adapted to prevent liquid ingress from entering into the electronic device to avoid damage (short circuiting of an electrical component, for example) to the electronic device. In this regard, the components and features of a pressure sensor may combine with a sealing element to seal off an opening of the electronic device that is used by the pressure sensor to detect ambient air.

In some instances, the pressure sensor may include a membrane that bends or deforms in response to a pressure change at the membrane. In this manner, the membrane may take the form of a diaphragm. Also, in some embodiments, a detection mechanism is secured with the membrane. Further, the detection mechanism may be embedded in the membrane. The detection mechanism may bend with the membrane and provide an output (including an electrical output) based on the bending or deforming of the detection mechanism (in conjunction with bending or deforming of the membrane). In this regard, the detection mechanism may include a strain gauge, as a non-limiting example. The detection mechanism may be electrically coupled with a processor circuit, such as a micro-electromechanical system (MEMS) chip. The processor circuit may be designed to receive the output and determine pressure, or change in pressure, exerted on the membrane based upon the electrical output.

Also, in order to shield the membrane and the processor circuit, a can may surround the membrane and the processor circuit. In order to shield additional components electrically coupled with the processor circuit (such as a circuit board and/or a flexible circuit), the can may also surround and cover these additional components. Further, in order to shield the circuit board from liquid ingress, the membrane may be designed as a waterproof membrane sealed with the can. Further, in some instances, the membrane is hermetically sealed with the can. The phrase "hermetically sealed" as used throughout this detailed description and in the claims refers a seal that is airtight and waterproof. As a result, a hermetically sealed component is designed to prevent air and water from entering the component.

In some instances, the pressure sensor of the electronic device may include a membrane secured with an opening of an enclosure of the electronic device. The membrane may change, by bending or deforming, in a manner previously described. However, rather than a detection mechanism secured with or embedded in the membrane, the sensor may include different means for detecting the membrane position. For example, the pressure sensor may include a light emitter that emits light in a direction toward the membrane. The light emitter may emit light in the form of UV light, infrared light, or laser light, as non-limiting examples. Further, the pressure sensor may include a light receiver positioned to receive the light reflected from the membrane. The location at which the light receiver receives the light can be used to determine the bent configuration of the membrane. In this regard, the light receiver may include a light detection grid that receives the light and determines a location of the light received by the light receiver. Also, the membrane may be formed from a material that not only allows the membrane to bend in response to a pressure change (at the membrane), but also reflects the light emitted from the light emitter to the light receiver.

The membrane may take on different configurations according to the pressure exerted on the membrane. Accordingly, light incident on the membrane may reflect from the membrane at different angles based on the pressure. For example, when pressure is exerted on the membrane to bend the membrane, the light reflects from the membrane at a particular angle and contacts the light detection grid at a particular location in accordance with the bent membrane. However, when a different pressure is exerted on the membrane, the membrane is bent in a different manner that the prior pressure. In this regard, the light reflects from the membrane at a different angle and contacts the light detection grid at a different location, thereby indicating a pressure change. Accordingly, the location of the light at the light receiver, and in particular, the light detection grid, may correspond to a pressure exerted on the membrane. Further, the light receiver may send the location-related information to a processor circuit in the pressure sensor (or to another processor circuit in the electronic device separate from the pressure sensor) to determine the pressure exerted on the membrane.

In response to pressure change, some pressure sensors may be capable of quickly and accurately determining pressure. However, as the pressure reaches a steady state pressure, the pressure change goes to zero (indicating no pressure change) and the pressure determined by the pressure sensor no longer provides an accurate pressure reading. In this regard, in order to more accurately determine pressure during rapid pressure change and during a period of little or no pressure change, the electronic device may include multiple pressure sensors used together to more accurately determine pressure exerted on the electronic device, with the electronic device relying upon one of the pressure sensors at a given time. For example, the electronic device may include a first pressure sensor that is relatively sensitive, and accordingly, more responsive to pressure change. The electronic device may further include a second pressure sensor that reacts more slowly to pressure change, but more accurately determines a steady state pressure.

The electronic device may use pressure information from the first pressure sensor during a pressure change, and then use pressure information from the second pressure sensor when the change in pressure decrease or ceases. In some instances, the electronic device may rely on pressure information from the first pressure sensor over a predetermined time interval that begins when a pressure change is detected (by the first pressure sensor, for example). Then, the electronic device relies upon the second pressure sensor after the predetermined time interval. Alternatively, the electronic device may rely upon the first pressure sensor to determine the pressure until the measured pressure determined by the first pressure sensor is equal to, or approximately equal to, the measure pressure determined by the second pressure sensor. When the aforementioned determined pressures are equal, the electronic device may then rely upon the second pressure sensor to determine the pressure. In this manner, by way of multiple pressure sensors, the electronic device may provide a more accurate pressure determination.

The electronic device may use the determined pressure for several applications. For example, the electronic device may be able to determine an elevation of the electronic device based upon the detected pressure, as pressure is known to change with elevation. Accordingly, the electronic device may provide a user with elevation information. Further, the electronic device can use the elevation information as a factor in determining an activity level (such as calories burned) of a user carrying the electronic device, as the activity level can vary according to the user's elevation.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates a plan view of an embodiment of an electronic device 100, in accordance with the described embodiments. In some embodiments, the electronic device 100 is a tablet device. In other embodiments, the electronic device 100 is a mobile wireless communication device, such as a smartphone. Still, in other embodiments, the electronic device 100 is a wearable electronic device, similar to a watch. When the electronic device 100 is a wearable electronic device, the electronic device 100 may include one or more bands (not shown) designed to wrap around an appendage (a wrist, for example) of a user.

As shown, the electronic device 100 may include an enclosure 102. In some embodiments, the enclosure 102 is formed from a metal, which may include aluminum, stainless steel, or ceramic, as non-limiting examples. In other embodiments, the enclosure 102 includes a metal alloy. The electronic device 100 may further include a display assembly 104 (shown as a dotted line) designed to present visual information. The display assembly 104 may include a touch-sensitive display assembly designed to respond to a capacitive coupling with the display assembly 104. The electronic device 100 may further include a protective cover 106 that overlays the display assembly 104. The protective cover 106 may include a material, such as glass or sapphire, that provides a transparent protective layer for the display assembly 104.

Also, the electronic device 100 may include one or more input features, such as a first input feature 108 and a second input feature 110. The first input feature 108 and/or the second input feature 110 may include a dial designed to rotate and provide an input to the electronic device 100 by rotation. Alternatively, or in combination, the first input feature 108 and/or the second input feature 110 may include a button designed to depress, in response to a force, in a direction toward the enclosure 102 and provide an input to the electronic device 100 by the depression. The first input feature 108 and/or the second input feature 110 may be used to generate an input or command to a processor circuit (not shown) in the electronic device 100. In response to the input or command, the processor circuit may use an executable program stored on a memory circuit (not shown) to change the visual information displayed on the display assembly 104. Also, the electronic device 100 may include one or more radio circuits (not shown) that provide the electronic device 100 with wireless communication capabilities, through means such as Bluetooth or 802.11 (Wi-Fi) protocol, to connect to a network as well as pair with an additional electronic device.

Figure 2:
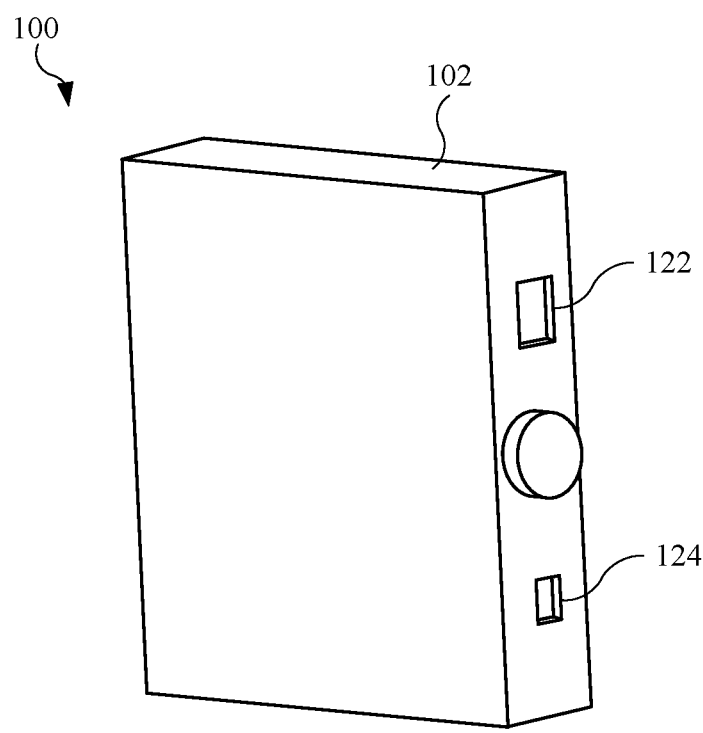
FIG. 2 illustrates an isometric rear view of the electronic device shown in FIG. 1.

FIG. 2 illustrates an isometric rear view of the electronic device 100 shown in FIG. 1, showing several openings in the enclosure 102. The enclosure 102 may include a first opening 122 and a second opening 124. In some embodiments, the first opening 122 allows emission through the enclosure 102 of acoustical energy in the form of audible sound from a speaker module (not shown) disposed in the electronic device 100. Also, in some embodiments, the second opening 124 that allows an input of audible sound through the enclosure 102 to a microphone (not shown) disposed in the electronic device 100. Although the first opening 122 and the second opening 124 are shown in distinct locations, the first opening 122 and the second opening 124 may vary in location along the enclosure 102, and further, may vary in size and shape. Further, the number of openings may vary according to the functionality of the electronic device 100. For example, an additional opening (not shown) may be used in conjunction with the first opening 122 to enhance the audible sound from the aforementioned speaker module.

In other embodiments, at least one of the first opening 122 and/or the second opening 124 is used as a vent for the electronic device 100 to allow air to flow into and/or out of the electronic device 100. Further, the electronic device 100 may include a sensor (not shown) that uses the airflow determine the pressure exerted on the electronic device. For example, when the electronic device 100 is subject to an elevation change, such as an elevation increase or decrease, the pressure exerted on the electronic device 100 changes. The vent may allow the electronic device 100 to respond to pressure changes (associated with elevation changes) by allowing the pressure inside the electronic device 100 to equilibrate to the ambient pressure outside the electronic device 100, which may prevent damage to the electronic device 100. In this regard, in some embodiments, the sensor includes a pressure sensor (not shown), or barometric sensor, designed to detect pressure exerted on the electronic device 100. This will be shown and described below.

Figure 3:
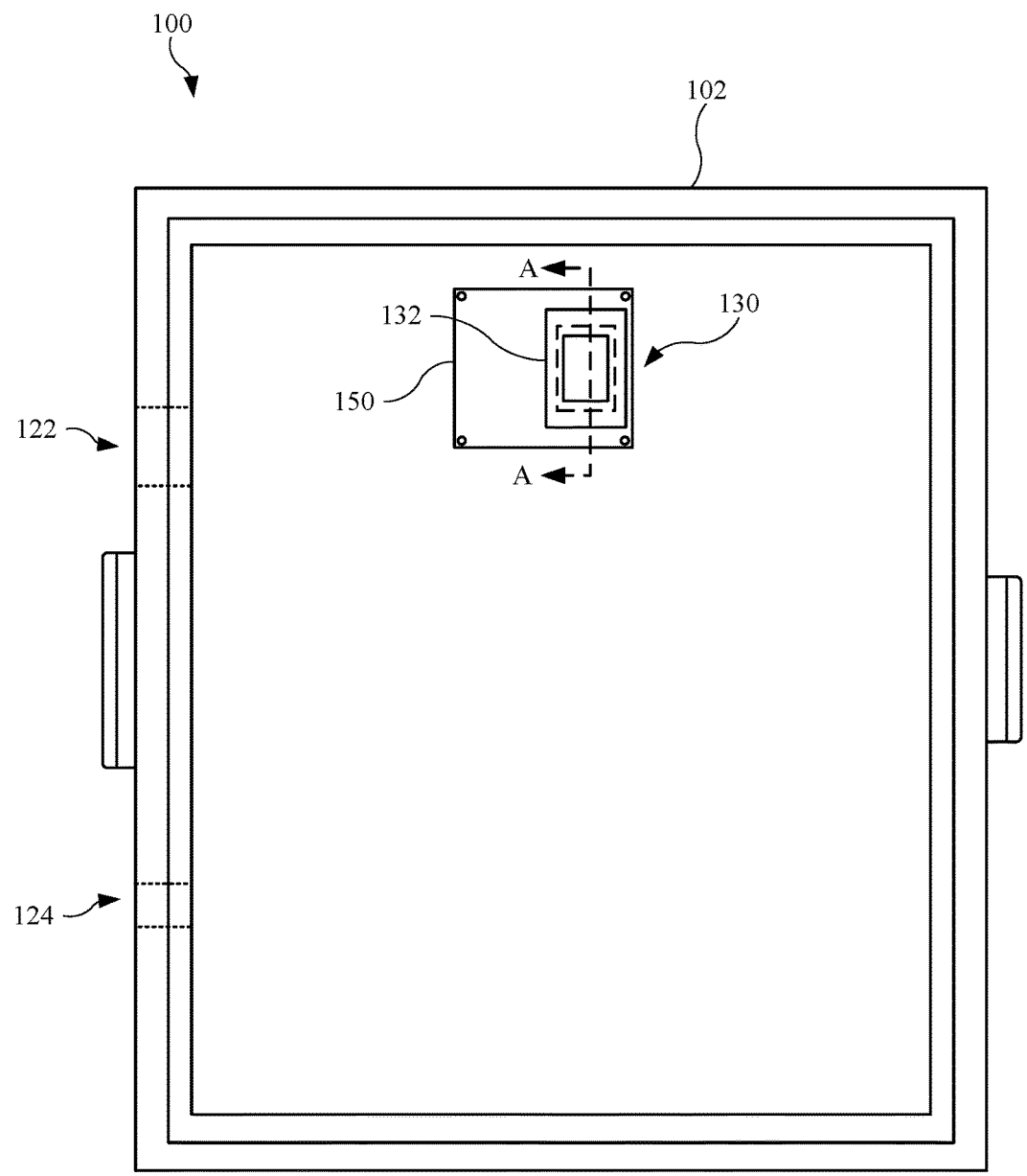
FIG. 3 illustrates an enlarged view of the electronic device shown in FIG. 1, with the display assembly and the protective layer removed.

FIG. 3 illustrates an enlarged view of the electronic device 100 shown in FIG. 1, showing a pressure sensor 130 disposed in the enclosure 102. For purposes of simplicity, the display assembly 104 and the protective cover 106 (both shown in FIG. 1), as well as several internal components, such as, processor circuits, memory circuits, and a battery, are removed. The electronic device 100 may use the pressure sensor 130 to determine pressure (including pressure change) exerted on the electronic device 100. Also, the pressure sensor 130 may be at least partially surrounded by a can 132 designed to shield several components of the pressure sensor 130. This will be shown and described below. The pressure sensor 130 and the can 132 may be disposed on a circuit board 150, with the pressure sensor 130 and a processor circuit (not shown) electrically coupled with the circuit board 150. The circuit board 150 may include a printed circuit board. However, in other embodiments, however, the circuit board 150 is a flexible circuit.

In order determine the pressure, the pressure sensor 130 may use airflow into and/or out of the electronic device 100 via the first opening 122 and/or the second opening 124 (both shown as dotted lines). Accordingly, the pressure sensor 130 may be used as an air pressure sensor. Further, the air may be forced into or out of the electronic device 100 due to a change in elevation. In this regard, the processor circuit may use a program or algorithm stored memory circuit (not shown) to calculate elevation based upon the air pressure, as determined by the pressure sensor 130. Alternatively, or in conjunction, the electronic device 100 may use the pressure to determine an activity level of a user of the electronic device 100. For example, the user's activity level may be determined in part by the user's elevation. Also, in some embodiments, the electronic device 100 is water-resistant electronic device. In this regard, when the electronic components of the electronic device 100 are shielded from water, the pressure sensor 130 may also be used as a water pressure sensor that determines water pressure exerted on the electronic device 100.

Figure 4:
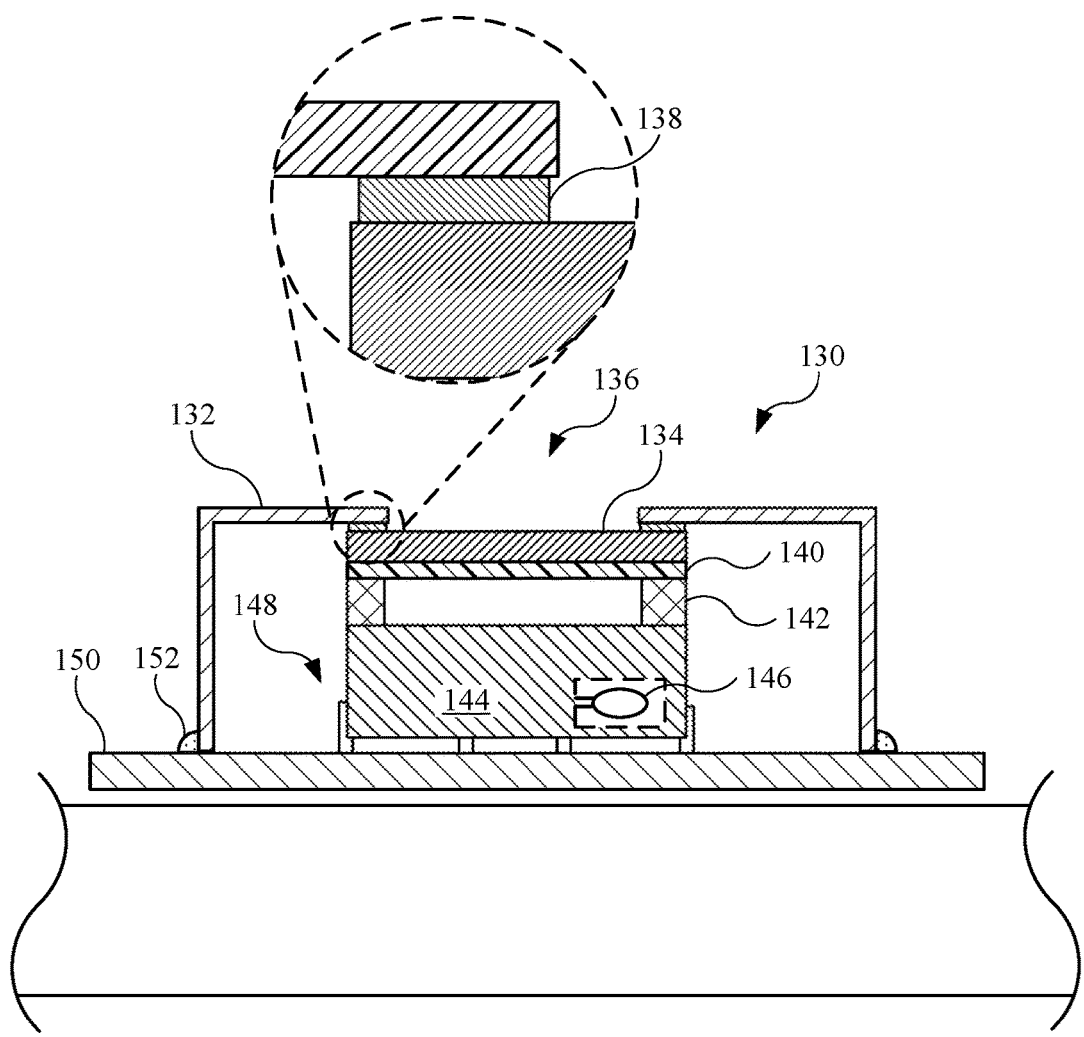
FIG. 4 illustrates a cross sectional view of the pressure sensor shown in FIG. 3, taken along line A-A.

FIG. 4 illustrates a cross sectional view of the pressure sensor 130 shown in FIG. 3, taken along line A-A shown in FIG. 3. The pressure sensor 130 may include a membrane 134 secured with the can 132 at an opening 136 of the can 132, with the opening 136 allowing airflow to the membrane 134. In this regard, the membrane 134 may actuate by bending or flexing in response to a pressure change based upon airflow to and from the membrane 134 (at the opening 136). For example, the membrane 134 may bend or flex in a direction away from the opening 136 in response to a pressure increase at the membrane 134. Alternatively, the membrane 134 may bend or flex in a direction toward the opening 136 in response to a pressure decrease at the membrane 134. This will be shown below. The membrane 134, and other embodiments of a membrane described herein, may include a material or materials designed to bend or flex in response to a change in pressure, when the pressure change to the membrane 134 is approximately 1-5 pounds per square inch ("psi").

Also, as shown in the enlarged view, the membrane 134 may be sealed with the can 132 by a sealing element 138 designed to provide a watertight, or waterproof, bond between the can 132 and the membrane 134. In some embodiments, the sealing element 138 is a pressure sensitive adhesive. In other embodiments, the sealing element 138 is a silicone rubber. The sealing element 138 may generally be any material that adhesively bonds with the can 132 and the membrane 134 while also providing a waterproof seal between the can 132 and the membrane 134. Also, the sealing element 138 may take the form of a gasket or an O-ring. In addition, the can 132 may be sealed from liquid ingress between the can and the circuit board 150 by a second sealing element 152 that extends around a perimeter of the circuit board 150. In this manner, when the membrane 134 is formed from a waterproof material, the electrical components of the pressure sensor 130 surrounded by the can 132, the membrane 134, and the circuit board 150 may be shielded from liquid contaminants, such as water or other aqueous-based solution. Also, in some embodiments, the membrane 134 includes a material having waterproof and airtight capabilities in order to prevent air and water from passing through the membrane 134. In this regard, the membrane 134 may define an airtight membrane hermetically sealed with the can 132. Also, the can 132 may be electrically coupled with the circuit board 150 in order to provide part of an electrical grounding path for the pressure sensor 130.

The pressure sensor 130 may further include a detection mechanism 140 designed to bend or flex along with the membrane 134 when the membrane 134 is actuated in response to a pressure change. In some embodiments, the detection mechanism 140 is embedded in the membrane 134. In the embodiment shown in FIG. 4, the detection mechanism 140 is coupled with, and shielded by, the membrane 134. Also, in some embodiments, the detection mechanism 140 is a strain gauge designed to change an electrical resistance in response to a bending or flexing of the membrane 134. Accordingly, the detection mechanism 140 may receive electrical current and provide an electrical resistance that changes with the bending or flexing of the detection mechanism. In other embodiments, the detection mechanism 140 is a capacitive sensor designed to change a capacitance level in response to a bending or flexing of the membrane 134. Still, in other embodiments, the detection mechanism 140 is an ultrasonic sensor that uses sound waves to detect a bending or flexing of the membrane 134. In any event, the detection mechanism 140 may be designed to provide an output, including an electrical output, by bending or flexing with the membrane 134. The output may be used to determine the pressure exerted on the electronic device 100 (shown in FIG. 3), and in particular, the membrane 134. As non-limiting examples, the electrical output may take the form of an electrical pulse that varies in frequency corresponding to the amount of bending or flexing of the membrane 134. Alternatively, the electrical output may take the form of an analog signal that varies in electrical current corresponding to the amount of bending or flexing of the membrane 134.

The pressure sensor 130 may further include a processor circuit 144 designed to receive the electrical output from the detection mechanism 140. In some embodiments, the processor circuit 144 includes a MEMS chip. As shown, the processor circuit 144 is separated by the detection mechanism 140 by a spacer element 142 that allow the membrane 134 and the detection mechanism 140 to bend with respect to the processor circuit 144. Further, the processor circuit 144 may be electrically coupled with the detection mechanism 140 via the spacer element 142, or another feature (not shown) embedded in the spacer element 142. Also, as shown in a partial internal view, the processor circuit 144 may include an air pocket 146 used by the processor circuit 144 as a reference pressure. In some embodiments, the air pocket 146 provides the processor circuit 144 with an absolute pressure. Accordingly, the pressure provided by the pressure sensor 130 may be compared with a reference pressure to provide a relative pressure. The processor circuit 144 may also include pins 148 that electrically couple the processor circuit 144 with the circuit board 150.

Also, in some embodiments (not shown), the pressure sensor 130 includes an application-specific integrated circuit (ASIC) that executes instructions from a program or algorithm stored on the ASIC chip and combines with the processor circuit 144 to determine the pressure based on the electrical output from the detection mechanism 140. In some cases, the ASIC chip is substituted for the processor circuit 144. Alternatively, the processor circuit 144 may use a program stored on a memory circuit (not shown) to determine the pressure based on the electrical output.

Figure 5:
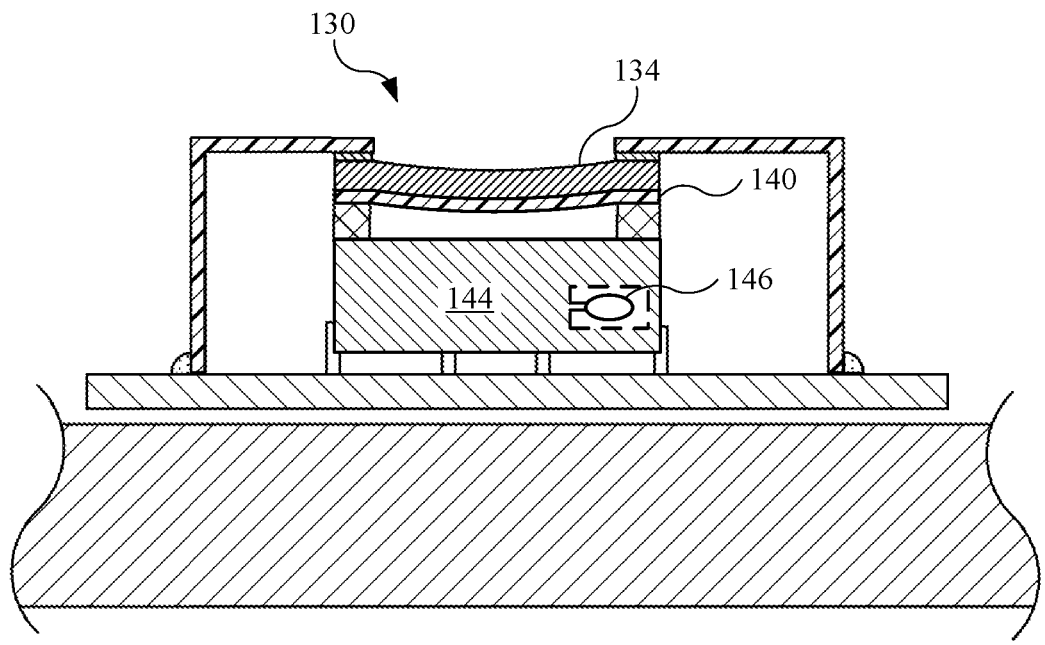
FIG. 5 illustrates a cross sectional view of the pressure sensor shown in FIG. 4, showing the membrane actuated in response to a pressure increase.

FIG. 5 illustrates a cross sectional view of the pressure sensor 130 shown in FIG. 4, showing the membrane 134 actuated in response to a pressure increase. The "pressure increase" may be associated with a rise in the amount of air per unit area at the membrane 134. As shown, the membrane 134 may bend or flex in a direction toward the processor circuit 144 when external pressure is greater than internal pressure. The "external pressure" may refer to air pressure exerted on the membrane 134 in a location exterior with respect to the pressure sensor 130 and the can 132. The "internal pressure" may refer to the reference pressure provided by the air pocket 146, or the air pressure in a space or void bound by the can 132, the membrane 134, and the circuit board 150. Also, the detection mechanism 140 may be actuated along with the membrane 134, causing the detection mechanism 140 to change an electrical output sent to the processor circuit 144. For example, the electrical output may increase in the form of an increased frequency pulse or an increased analog output current, and based on the electrical output, the processor circuit 144 may determine the pressure is increased at the membrane 134.

Figure 6:
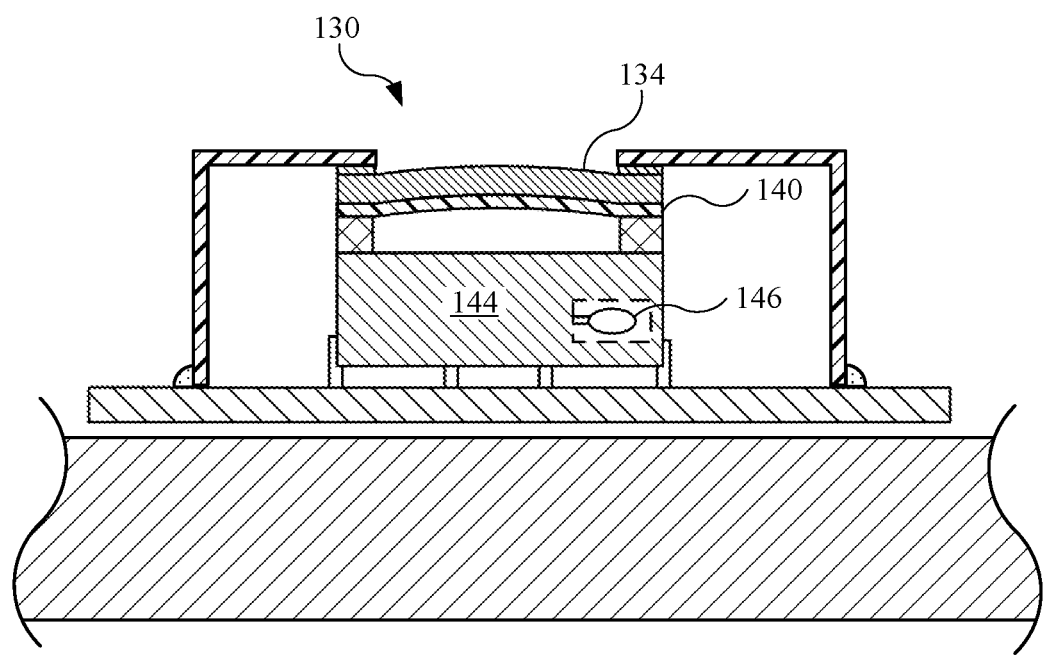
FIG. 6 illustrates a cross sectional view of the pressure sensor shown in FIG. 4, showing the membrane actuated in response to a pressure decrease.

FIG. 6 illustrates a cross sectional view of the pressure sensor shown in FIG. 4, showing the membrane 134 actuated in response to a pressure decrease. The "pressure decrease" may be associated with a reduction in the amount of air per unit area at the membrane 134. As shown, the membrane 134 may bend or flex in a direction away from the processor circuit 144 when external pressure is less than internal pressure. In other words, the pressure external with respect to the membrane 134 and the can 132 is less than the reference pressure provided by the air pocket 146, or the pressure in a space or void bound by the can 132, the membrane 134, and the circuit board 150. As shown, the membrane 134 may again actuate along with the detection mechanism 140 with the pressure decrease, causing the detection mechanism 140 to change an electrical output sent to the processor circuit 144. However, the electrical output may differ. For example, the electrical output may decrease in the form of a reduced frequency pulse or a reduced analog output current. The processor circuit 144 may then determine the pressure is decreased at the membrane 134.

Figure 7:
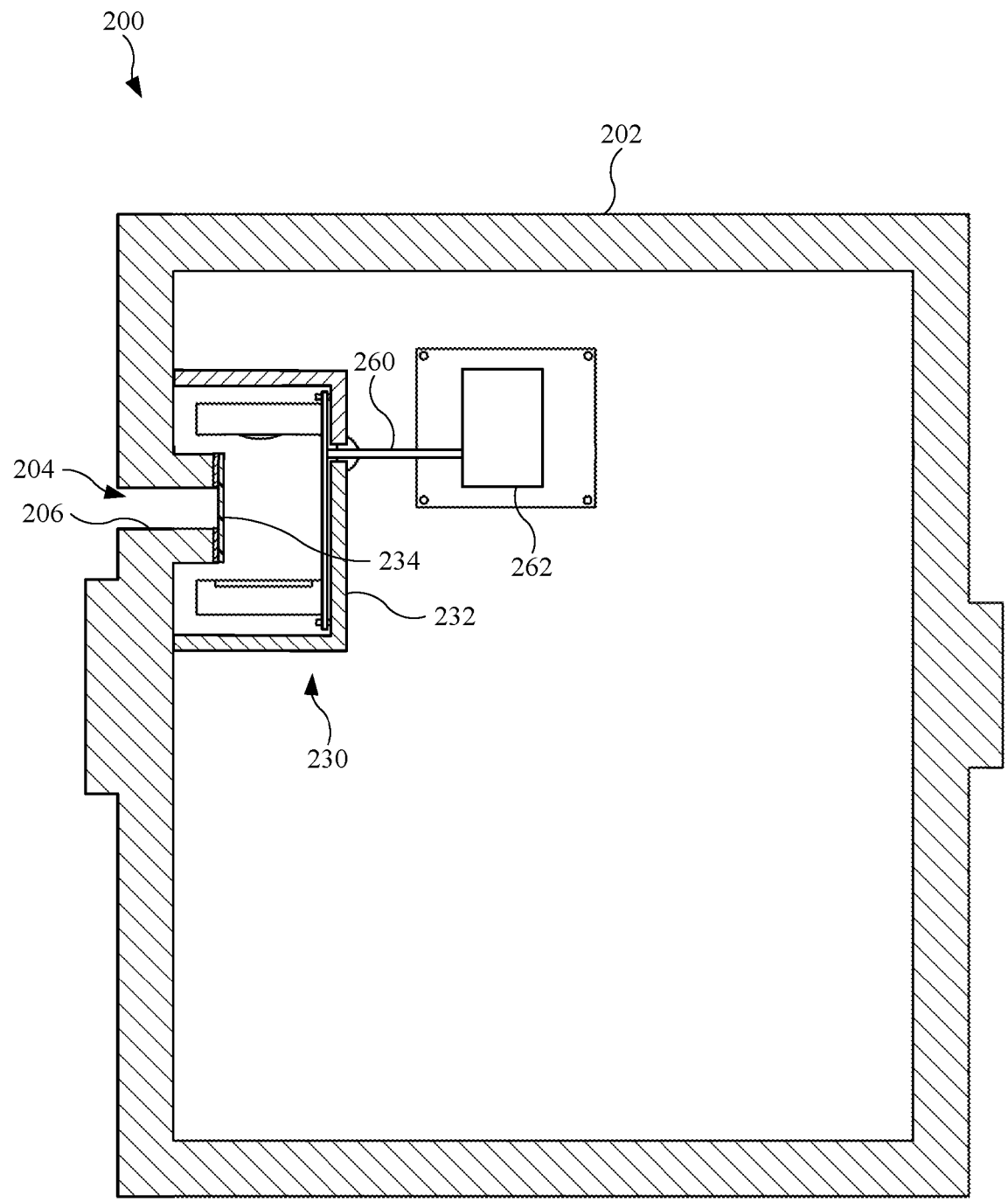
FIG. 7 illustrates an enlarged cross sectional view of an alternate embodiment of an electronic device, showing an alternate embodiment of a pressure sensor, in accordance with the described embodiments.

FIG. 7 illustrates an enlarged cross sectional view of an alternate embodiment of an electronic device 200, showing an alternate embodiment of a pressure sensor 230, in accordance with the described embodiments. The electronic device 200 may include any feature or features previously described for an electronic device. Also, for purposes of illustration, a protective cover and a display assembly, as well as several internal components, are removed. As shown, the electronic device 200 may include an enclosure 202 that includes an opening 204 used by the pressure sensor 230 to receive airflow (initially) external with respect to the electronic device 200, or allow the airflow to exit the electronic device 200. The opening 204 may be similar to that of the first opening 122 and/or the second opening 124 (shown in FIG. 2). Further, in some embodiments, as shown in FIG. 7, the opening 204 may include a channel 206 extending into the enclosure 202.

The pressure sensor 230 may include a housing 232 that surrounds the opening 204 and the channel 206. A cross sectional view of the housing 232 is shown in order to show internal components of the pressure sensor 230. However, the housing 232 may surround the internal components of the pressure sensor 230. Also, as shown, the housing 232 includes an opening allowing a cable 260 (or in some cases, a flexible circuit) to extend from an internal component of the pressure sensor 230 to an integrated circuit 262 via the opening in order to place the pressure sensor 230 in communication with the integrated circuit 262. Also, in some cases, the housing 232 may be hermetically sealed with the enclosure 202 as well as the opening through which the cable 260 extends. Also, the pressure sensor 230 may include a membrane 234 hermetically sealed with the enclosure 202 at the channel 206. The means for hermetically sealing structural features may include any material previously described for hermetically sealing components. However, in some embodiments, the membrane 234 is waterproof but allows air to pass or permeate through the membrane 234. The pressure sensor 230 may include additional components that will be described below.

Figure 8:
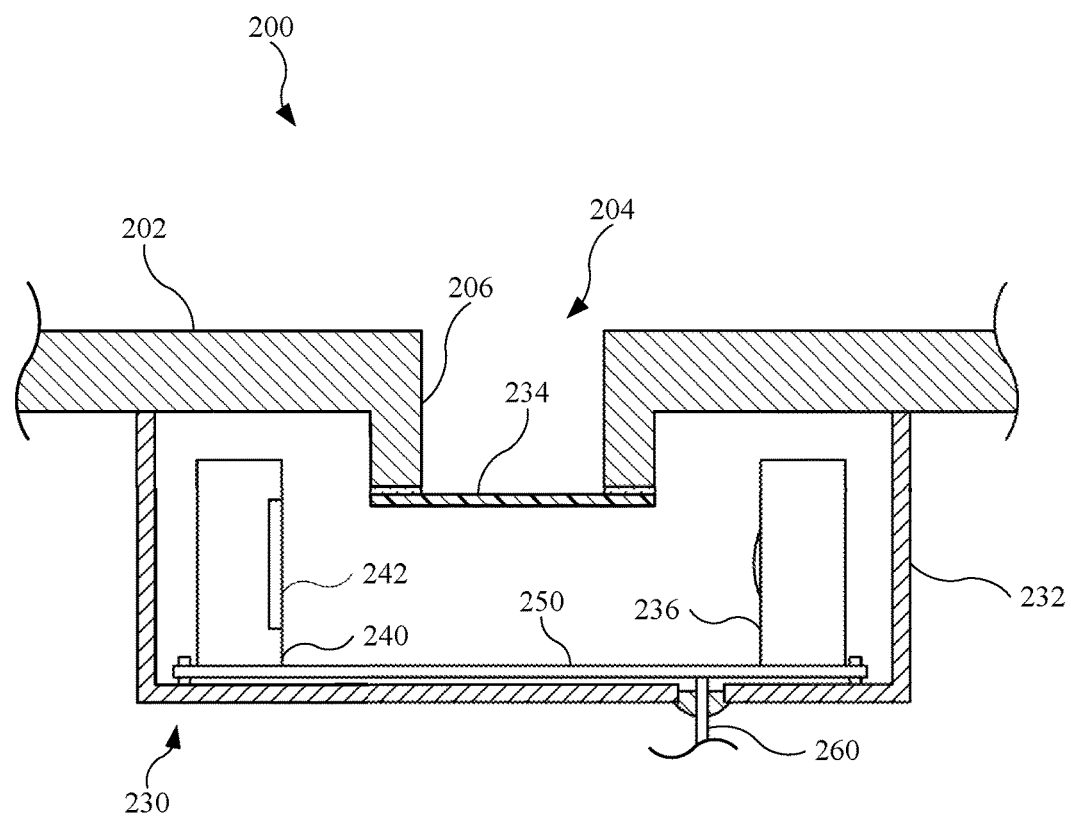
FIG. 8 illustrates a side view of the pressure sensor shown in FIG. 7.

FIG. 8 illustrates an enlarged cross sectional view of the electronic device 200 shown in FIG. 7, showing an enlarged view of the pressure sensor 230. As shown, the membrane 234 is adhesively secured with the opening 204 at the channel 206. The pressure sensor 230 may include a light emitter 236 designed to emit light (not shown) in a direction toward the membrane 234. As non-limiting examples, the light emitter 236 may include a visible light source, a nonvisible infrared light source, or a laser light source. Also, the membrane 234 may be formed from a material, or materials, designed to reflect the light emitted from the light emitter 236. Also, the light emitter 236 may receive electrical current from a power source (not shown) such as a battery disposed in the electronic device 200.

The pressure sensor 230 may further include a light receiver 240 that receives the light from the light emitter 236 that is reflected from the membrane 234. The light receiver 240 is selected based upon the type of light (visible light, for example) emitted from the light emitter 236. The light receiver 240 may include a light detection grid 242 used by the light receiver 240 to determine a position or location at which light from the light emitter 236 contacts the light receiver 240. It should be understood that the light from the light emitter 236 received by the light detection grid 242 is reflected from the membrane 234 prior to contacting the light detection grid 242.

The pressure sensor 230 may use the location of the light received by the light receiver 240 at the light detection grid 242 to determine the pressure exerted on the membrane 234. For example, when the membrane 234 bends or flexes in response to the pressure, or a change in pressure, the membrane 234 reflects the light emitted from the light emitter 236 at different angles, based upon the bending of the membrane 234. Accordingly, the light receiver 240 may receive the light at different locations, allowing the pressure sensor 230 to determine the pressure based upon the location of the light at the light detection grid 242. The light receiver 240 may include a processor circuit (not shown) that executes a program or algorithm to determine pressure based upon the location. In this regard, the light receiver 240 may send the location information to an integrated circuit (not shown) of the electronic device 200 by way of the circuit board 250 electrically coupled with the light receiver 240 and the cable 260. Alternatively, the light receiver 240 may communicate the location information to a different circuit external to the pressure sensor 230 that determines the pressure.

Figure 9:
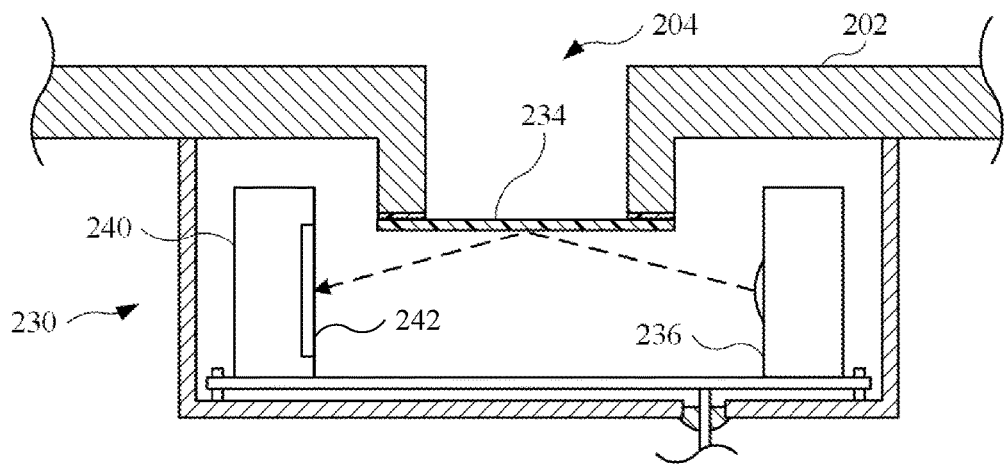
FIG. 9 illustrates a partial cross sectional view of the pressure sensor shown in FIG. 8, showing the membrane when the external pressure is equal, or approximately equal, to the internal pressure.
Figure 10:
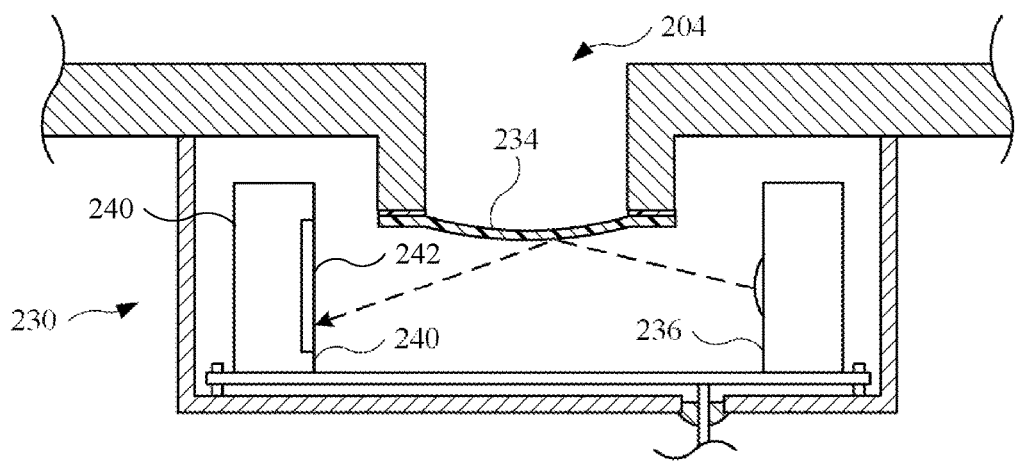
FIG. 10 illustrates a partial cross sectional view of the pressure sensor shown in FIG. 8, showing the membrane actuated in response to a pressure increase.
Figure 11:
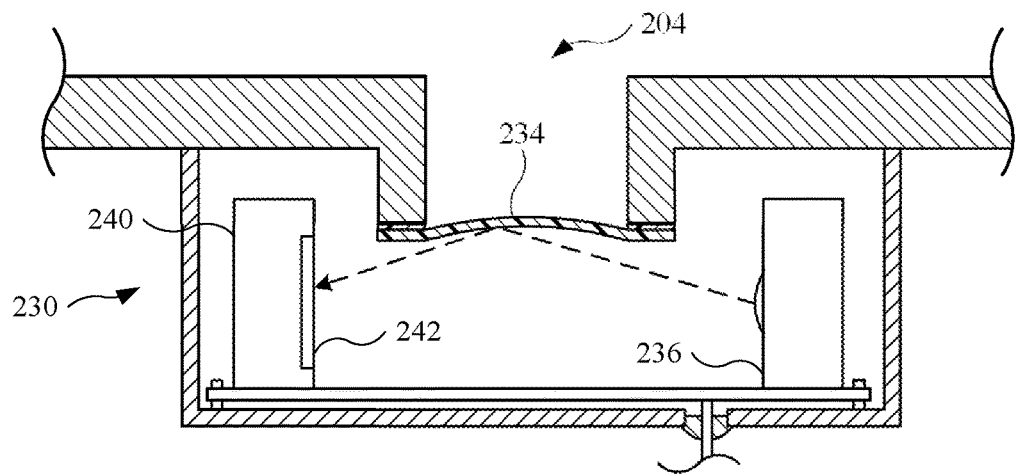
FIG. 11 illustrates a partial cross sectional view of the pressure sensor shown in FIG. 8, showing the membrane actuated in response to a pressure decrease.

FIGS. 9-11 illustrate exemplary light paths of the light (shown as dotted lines) emitted from the light emitter 236, reflected by the membrane 234, and received by the light receiver 240. While distinct light paths are shown, several different light paths are possible. FIG. 9 illustrates a partial cross sectional view of the pressure sensor 230 shown in FIG. 8, showing the membrane 234 when the external pressure acting on the membrane 234 is equal, or approximately equal, to the internal pressure acting on the membrane 234. As a result, the membrane 234 is generally flat and the light receiver 240 receives the reflected light at a central location of the light detection grid 242.

FIG. 10 illustrates a partial cross sectional view of the pressure sensor 230 shown in FIG. 8, showing the membrane 234 actuated in response to a pressure increase. As a result, the external pressure acting on the membrane 234 is greater than the internal pressure acting on the membrane 234, causing the membrane to bend or flex inward in a direction away from the opening 204. Conversely, FIG. 11 illustrates a partial cross sectional view of the pressure sensor 230 shown in FIG. 8, showing the membrane 234 actuated in response to a pressure decrease. As a result, the external pressure acting on the membrane 234 is less than the internal pressure acting on the membrane 234, causing the membrane to bend or flex inward in a direction toward the opening 204.

As shown in FIGS. 10 and 11, the bending or flexing of the membrane 234 causes light emitted from the light emitter 236 to contact the membrane 234 at different locations of the membrane 234, indicating a pressure change. Further, the location of the light at the light receiver 240, and in particular, the light detection grid 242, may determine a pressure increase (in FIG. 10) or a pressure decrease (in FIG. 11). However, other configurations are possible. For example, the light emitter 236 and/or membrane 234 can be reconfigured or repositioned to direct light toward different locations of the light receiver 240 in order to determine a pressure increase or pressure decrease.

In some embodiments, the membrane 234 is formed from an air-permeable, waterproof material. Accordingly, the membrane 234 is designed to allow air, but not water, to pass through porous regions of the membrane 234. Nonetheless, the airflow may initially cause the membrane 234 to bend or flex in a manner previously described. However, once the internal pressure inside the pressure sensor 230 equilibrates to the external pressure outside the pressure sensor 230, the membrane 234 may return to its original (flat) configuration, shown in FIG. 9. For example, during a pressure increase (shown in FIG. 10), ambient air passes through the membrane 234 into the pressure sensor 230 until the external pressure is the same as, or substantially similar to, the internal pressure. Once the internal pressure equilibrates with the external pressure, the membrane 234 returns to its original (flat) configuration, shown in FIG. 9. Conversely, during a pressure decrease (shown in FIG. 11), ambient air passes through the membrane 234 out of the pressure sensor 230 until the external pressure is the same as, or substantially similar to, the internal pressure, and the membrane 234 again returns to its original (flat) configuration, shown in FIG. 9.

Figure 12:
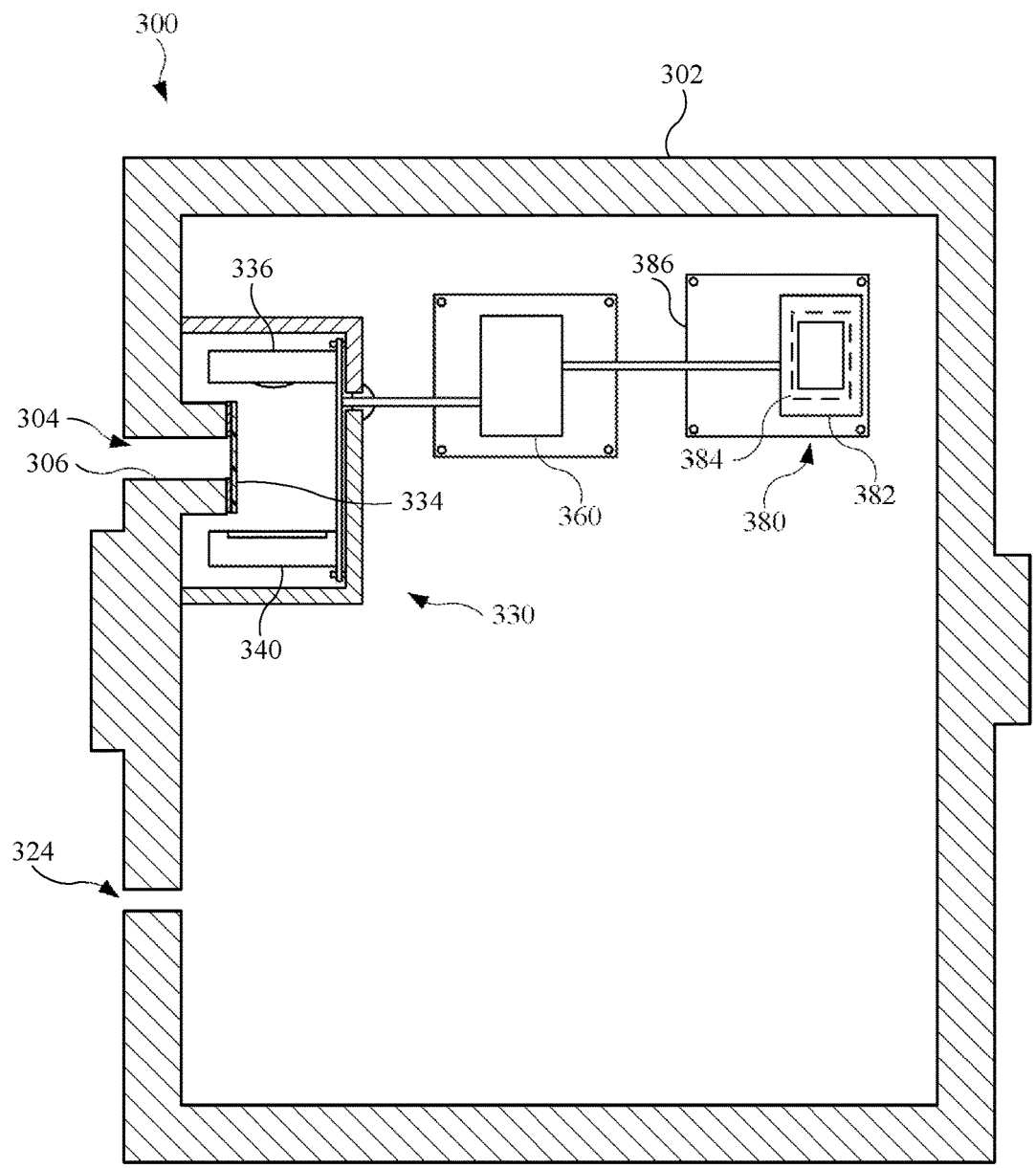
FIG. 12 illustrates an enlarged view of an alternate embodiment of an electronic device having a first pressure sensor and a second pressure sensor.

FIG. 12 illustrates an enlarged view of an alternate embodiment of an electronic device 300 having a first pressure sensor 330 and a second pressure sensor 380. The electronic device 300 may include any feature or features previously described for an electronic device 300. As shown, the electronic device 300 includes an enclosure 302 that includes an opening 304. The opening 304 may include a channel 306 extending into the enclosure 302. The first pressure sensor 330 may use the opening 304 and the channel 306 to receive airflow in a manner previously described for a pressure sensor 230 (shown in FIGS. 8-11). In this regard, the first pressure sensor 330 may include several features and components similar to that of the pressure sensor 230 (shown in FIGS. 8-11), and accordingly, may function in a similar manner as that of the pressure sensor 230. For example, the first pressure sensor 330 may include a membrane 334 secured with the channel 306 to receive airflow via the opening 304, with the membrane 334 designed to bend or flex in response to a change in pressure. The first pressure sensor 330 may further include a light transmitter 336 designed to direct light toward the membrane, and a light receiver 340 designed to receive light from the light transmitter 336 that is reflected from the membrane 334. The light receiver 340 may include a light detection grid (not labeled) that determines a location at which the light receiver 340 receives the reflected light.

The second pressure sensor 380 may include a can 382 and a membrane 384 hermetically sealed with the can 382. Also, although not shown, the second pressure sensor 380 may include a detection mechanism secured with the membrane 384 and a processor circuit, both of which may be enclosed by the can 382, the membrane 384, and a circuit board 386. The membrane 384 may bend or flex in response to a pressure change. In this regard, the second pressure sensor 380 may include any feature or features previously described for a pressure sensor 130 (shown in FIGS. 3-6). However, in some embodiments, the second pressure sensor 380 may include a can 382 that is not sealed with a membrane 384. Also, the membrane 384 may respond to pressure changes from air received from an opening 324 of the electronic device 300.

The electronic device 300 may also include a processor circuit 360 electrically coupled with the first pressure sensor 330 and the second pressure sensor 380 to receive information related to pressure as determined by the first pressure sensor 330 and the second pressure sensor 380. The processor circuit 360 may include an integrated circuit that uses a program or algorithm to process electrical outputs received from the first pressure sensor 330 and the second pressure sensor 380, and determine the pressure exerted on the electronic device 300. The pressure may include a first pressure measurement based on the output from the first pressure sensor 330, and a second (separate) pressure measurement based on the output from the second pressure sensor 380. Further, it may be advantageous for the electronic device 300 to use the information from one of the two pressure sensors at a given time. For example, when the electronic device 300 undergoes a pressure change (increase or decrease), the first pressure sensor 330 may be designed to respond to the pressure change relatively quickly, as compared to the second pressure sensor 380. Accordingly, during a period of initial pressure change, the processor circuit 360 may use the pressure information from the first pressure sensor 330 and ignore the pressure information from the second pressure sensor 380.

However, when the electronic device 300 reaches an equilibrium condition in which the external pressure (external to the electronic device 300) and the internal pressure of the electronic device 300 are the same, the first pressure sensor 330 may provide pressure information to the processor circuit 360 indicating that the pressure is no longer changing. Accordingly, in some cases, the first pressure sensor 330 may determine the pressure is "zero" as the external pressure is neither greater than nor less than the internal pressure. In this regard, the processor circuit 360 may then ignore the pressure information received from the first pressure sensor 330 and use the pressure information from the second pressure sensor 380, which may determine the pressure with respect to an absolute pressure. In other words, the second pressure sensor 380 may determine a relative pressure. Accordingly, the processor circuit 360 may selectively use information from the first pressure sensor 330 or the second pressure sensor 380 based on real-time pressure conditions as determined by the aforementioned pressure sensors.

In some instances, the processor circuit 360 relies on a predetermined time interval (or time period) to determine which pressure sensor to use to determine the pressure. The predetermined time period may begin when the first pressure sensor 330 indicates a change in pressure. For example, when the first pressure sensor 330 determines a pressure increase, the predetermined time interval may begin. However, subsequent to the predetermined time interval, the processor circuit 360 may use the pressure, determined by the second pressure sensor 380, and ignore pressure determined by the first pressure sensor 330. Alternatively, the processor circuit 360 may co-monitor the first pressure sensor 330 and the second pressure sensor 380. In this manner, during a pressure change, the processor circuit 360 may use the pressure only from the first pressure sensor 330 to determine the pressure at the electronic device 300 until the first pressure sensor 330 and the second pressure sensor 380 provide the same, or substantially similar, pressure information indicating both sensors are providing outputs that indicate the same or substantially similar measured pressure. Then, the processor circuit 360 may use the pressure information only from the second pressure sensor 380 to determine the pressure at the electronic device 300. In some embodiments, the processor circuit 360 may also incorporate a predetermined time interval, and as a confirmation, determine when the first pressure sensor 330 and the second pressure sensor 380 indicate the same, or substantially similar, pressure. In this regard, the processor circuit 360 may use the predetermined time interval to confirm when to switch from using information provided by the first pressure sensor 330 to using information provided by the second pressure sensor 380. Alternatively, the processor circuit 360 may rely only upon pressure information from the first pressure sensor 330 until the first pressure sensor 330 no longer determines a pressure change, at which point the processor circuit 360 may ignore pressure information from the first pressure sensor 330 and rely only upon pressure information from the second pressure sensor 380.

Figure 13:
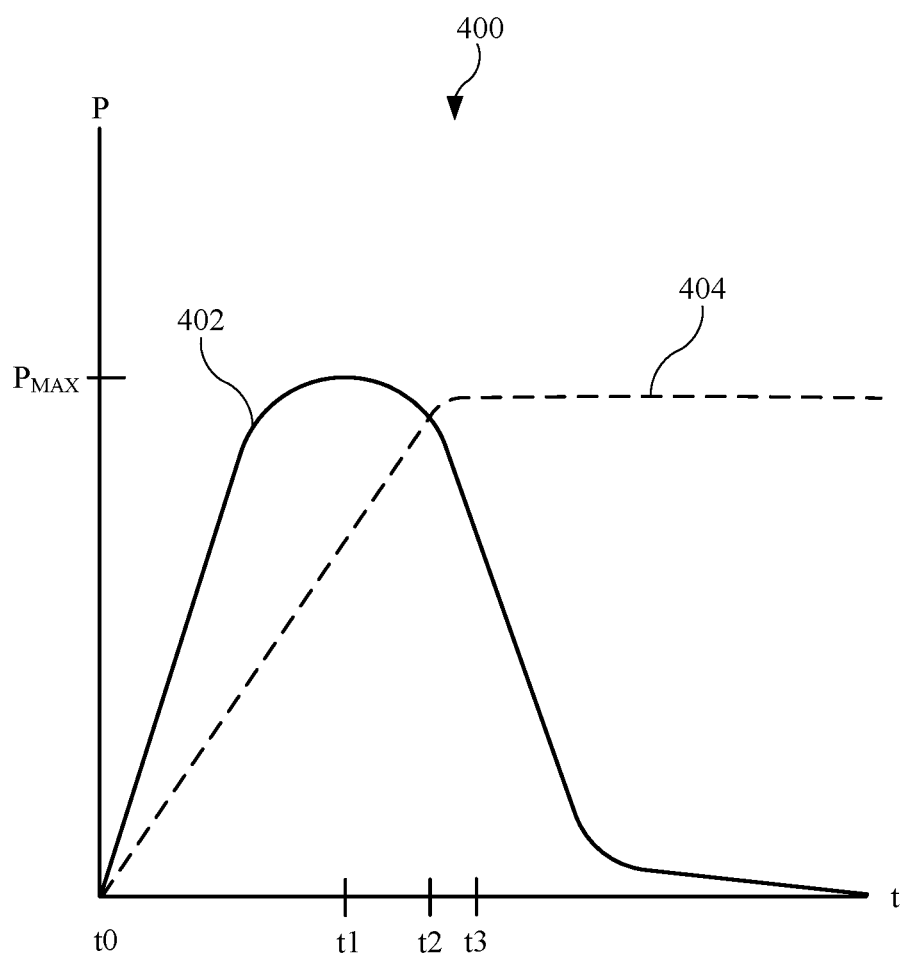
FIG. 13 illustrates a graph of pressure over time of an electronic device as measured by a first pressure sensor and a second pressure sensor of the electronic device, in accordance with the described embodiments.

FIG. 13 illustrates a graph 400 of pressure (P) over time (t) of an electronic device as measured by a first pressure sensor and a second pressure sensor of the electronic device, in accordance with the described embodiments. The electronic device may include the electronic device 300 shown in FIG. 12, having the first pressure sensor 330 and the second pressure sensor 380, both of which are designed to provide pressure information to the processor circuit 360 in a manner previously described. The electronic device described in FIG. 13 may be designed to rely on pressure information from one of the first pressure sensor and the second pressure sensor, based upon certain conditions.

The graph 400 shows a first plot 402 of pressure determined by the first pressure sensor, and also a second plot 404 (dotted lines) of pressure determine by the second pressure sensor. As shown from an initial time t0 to time t1, in response to a pressure increase, the first plot 402 shows the pressure rising more quickly than that of the second plot 404, indicating the first pressure sensor is more responsive to pressure changes, from time t0 to t1, as compared to the second pressure sensor. Accordingly, from time t0 to t1, the first pressure sensor more accurately follow the pressure, as compared to the second pressure sensor, and the processor circuit may use the information from the first pressure sensor and ignore the information from the second pressure sensor.

At time t1, the first pressure sensor determines a maximum pressure Pmax, as shown by the first plot 402. Further, at Pmax, the first pressure sensor determines the pressure change is zero, and the first plot 402 begins to decrease after Pmax. In some instances, the processor circuit may use pressure information from the first pressure sensor until the first pressure sensor determines no pressure change (Pmax) or a decrease in pressure change. In this regard, at Pmax, or when the pressure change is less than zero, the processor circuit may then ignore pressure information from the first pressure sensor and rely upon pressure information from the second pressure sensor.

The processor circuit may determine when to use the first pressure sensor or the second pressure sensor by alternative means. For example, the graph 400 shows that at time t2, the first plot 402 is the same as the second plot 404, indicating both the first pressure sensor and the second pressure sensor determine the same pressure. When this information is provided to the processor circuit, the processor circuit may ignore the first pressure sensor (and the pressure information from the first plot 402) and use the second pressure sensor (and the pressure information from the second plot 404).

Alternatively, the electronic device may use the pressure sensors in a different manner. For example, at time t0, the first pressure sensor may determine a pressure change triggering a predetermined time interval to begin, and the processor circuit may rely upon the first pressure sensor for the predetermined time interval. In this instance, the predetermined time interval is from t0 to t3. The processor circuit may rely upon the first pressure sensor until time t3, at which point the processor circuit may ignore the first pressure sensor (and the pressure information from the first plot 402) and use the second pressure sensor (and the pressure information from the second plot 404).

Figure 14:
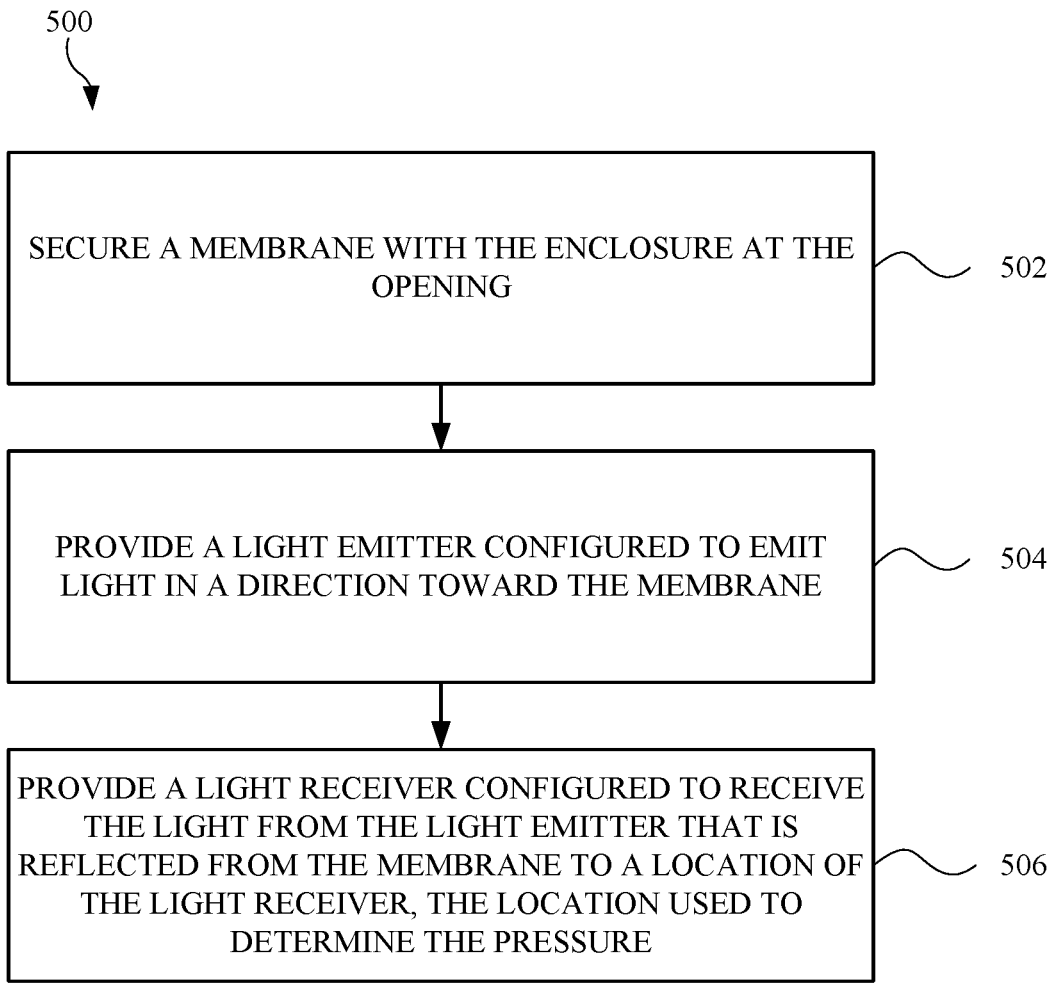
FIG. 14 illustrates a flowchart showing a method for detecting pressure for an electronic device having an enclosure and an opening, in accordance with the described embodiments.

FIG. 14 illustrates a flowchart 500 showing a method for detecting pressure for an electronic device having an enclosure and an opening, in accordance with the described embodiments. In step 502, a membrane is secured with the opening. The membrane may be configured to change from an initial configuration, corresponding to a first pressure, to a bent configuration, corresponding to a second pressure different from the first pressure.

In step 504, a light emitter is provided. The light emitter may be configured to emit light in a direction toward the membrane. The light emitter may include a visible light source, a UV light source, or a laser light source, as non-limiting examples. Also, the membrane may include a material or materials that reflect the light from the light emitter.

In step 506, a light receiver is provided. The light receiver may be configured to receive the light from the light emitter that is reflected from the membrane to a location of the light receiver. The light receiver may include a light detection grid that determines the location at which the light contacts the light receiver. The location can be used to determine the pressure.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A sensor for detecting pressure exerted on an electronic device, the sensor comprising:
   a membrane that bends in response to the pressure;
   a detection mechanism engaged with the membrane, the detection mechanism capable of bending in conjunction with the membrane; and
   a processor circuit electrically coupled with the detection mechanism, the processor circuit comprising an air pocket that provides a reference pressure, wherein when the detection mechanism provides an electrical output to the processor circuit, the processor circuit correlates the electrical output with a pressure that is compared to the reference pressure to determine a relative pressure.

2. The sensor of claim 1, wherein the circuit comprises an air pocket defining a reference pressure, and wherein the processor circuit compares the pressure with the reference pressure to determine a relative pressure.

3. The sensor of claim 2, further comprising:
   a circuit board that receives the processor circuit; and
   a can comprising an opening, wherein the can is secured with the membrane at the opening, and wherein the can is secured with the processor circuit.

4. The sensor of claim 3, wherein in response to a pressure increase, the membrane and the detection mechanism bend away from the opening, and wherein in response to a pressure decrease the membrane and the detection mechanism bend toward the opening.

5. The sensor of claim 3, wherein the membrane is hermetically sealed with the can, and wherein the can is sealed with the circuit board.

6. The sensor of claim 1, further comprising a spacer element between the detection mechanism and the processor circuit, the spacer element allowing the membrane and the detection mechanism to bend.

7. The sensor of claim 1, wherein the detection mechanism includes at least one of a strain gauge or a capacitive sensor.

8. An electronic device having an enclosure and an opening, the electronic device comprising:
   an enclosure that defines an internal volume;
   a display assembly coupled with the enclosure, the display assembly enclosing the internal volume;
   a membrane secured with the enclosure at the opening, the membrane configured to bend in response to a change in pressure; and
   a sensor configured to determine the pressure and positioned in the enclosure, the sensor comprising:
   a light emitter configured to emit light in a direction toward the membrane, and
   a light receiver configured to receive the light from the light emitter that is reflected from the membrane to
   a location of the light receiver, the location used to determine the pressure.

9. The electronic device of claim 8, further comprising a housing secured with the enclosure to hermetically seal the membrane, the light emitter, and the light receiver.

10. The electronic device of claim 9, further comprising a processor circuit disposed between the housing and the enclosure, the processor circuit configured to receive from the light receiver i) a first location of the light corresponding to a first pressure, and ii) a second location of the light receiver corresponding to a second pressure, the second location different from the first location.

11. The electronic device of claim 8, further comprising:
    a processor circuit electrically coupled with the sensor; and
    a second pressure sensor positioned in the enclosure, wherein in response to the change in the pressure, the processor circuit uses the sensor to determine the pressure for a predetermined time interval, and after the predetermined time interval the processor circuit uses the second pressure sensor to determine the pressure.

12. The electronic device of claim 11, wherein the second pressure sensor comprises:
    a second membrane configured to bend in response to the pressure;
    a detection mechanism secured with the second membrane; and
    a circuit electrically coupled with the detection mechanism, wherein the detection mechanism bends in conjunction with the second membrane and provides an electrical output to the circuit to determine the pressure.

13. The electronic device of claim 8, wherein:
    the opening includes a channel that extends into the enclosure, and
    the membrane comprises a waterproof membrane hermetically sealed with the channel.

14. The electronic device of claim 13, wherein:
    the membrane extends away from the channel when the pressure at the membrane increases, and
    the membrane extends partially into the channel when the pressure at the membrane decreases.

15. A method for assembling a sensor in an electronic device having an enclosure and an opening, the sensor configured to determine pressure exerted on the electronic device, the method comprising:
    securing a membrane with the enclosure at the opening, the membrane configured to bend in response to a change in the pressure at the membrane;
    providing a light emitter in the enclosure, the light emitter configured to emit light in a direction toward the membrane, and
    providing a light receiver in the enclosure, the light emitter configured to receive the light from the light emitter that is reflected from the membrane to a location of the light receiver, the location used to determine the pressure.

16. The method of claim 15, further comprising securing a housing with the enclosure to seal the membrane, the light emitter, and the light receiver.

17. The method of claim 15, further comprising securing a second pressure sensor in the enclosure, wherein the electronic device is configured to select one of the pressure sensor and the second pressure sensor to determine the pressure.

18. The method of claim 15, wherein securing the membrane with the opening comprises securing a waterproof membrane with the opening.

19. The method of claim 18, wherein securing the membrane with the opening comprises securing the membrane with a channel defined by the opening.

20. The method of claim 18, wherein securing the membrane with the opening comprises securing the membrane with an airtight membrane.

\* \* \* \* \*